United States Patent
Wang et al.

(10) Patent No.: US 7,398,824 B1
(45) Date of Patent: Jul. 15, 2008

(54) METHOD FOR INHIBITING OR CONTROLLING INORGANIC SCALE FORMATIONS WITH COPOLYMERS OF ACRYLAMIDE AND QUATERNARY AMMONIUM SALTS

(75) Inventors: Xiaolan Wang, Spring, TX (US); Qi Qu, Spring, TX (US); Mingjie Ke, Spring, TX (US)

(73) Assignee: BJ Services Company, Houston, TX (US)

( * ) Notice: Subject to any disclaimer, the term of this patent is extended or adjusted under 35 U.S.C. 154(b) by 246 days.

(21) Appl. No.: 11/345,247

(22) Filed: Feb. 1, 2006

Related U.S. Application Data

(63) Continuation-in-part of application No. 10/671,156, filed on Sep. 25, 2003, now Pat. No. 7,159,655.

(51) Int. Cl.
 *E21B 37/00* (2006.01)
 *E21B 43/26* (2006.01)
 *E21B 43/27* (2006.01)

(52) U.S. Cl. ............ 166/279; 166/307; 166/308.2; 166/310; 166/312; 507/222; 507/224; 507/225; 507/229; 507/242; 507/243; 507/244; 507/927

(58) Field of Classification Search ......... 507/222–225, 507/229, 242–244, 927; 166/279, 300, 307, 166/308.2, 310, 312, 371
 See application file for complete search history.

(56) References Cited

U.S. PATENT DOCUMENTS

| | | | |
|---|---|---|---|
| 3,744,566 A * | 7/1973 | Szabo et al. ............... 166/275 |
| 4,532,052 A | 7/1985 | Weaver et al. | |
| 4,536,303 A * | 8/1985 | Borchardt ................. 507/222 |
| 4,630,679 A | 12/1986 | Reeves, III et al. | |
| 4,762,626 A | 8/1988 | Emmons et al. | |
| 5,213,691 A | 5/1993 | Emmons et al. | |
| 5,224,543 A | 7/1993 | Watkins et al. | |
| 5,282,976 A | 2/1994 | Yeung | |
| 5,342,530 A | 8/1994 | Aften et al. | |
| 5,342,540 A | 8/1994 | Perez | |
| 5,465,792 A | 11/1995 | Dawson et al. | |
| 6,090,773 A * | 7/2000 | Lukenbach et al. ........ 510/475 |
| 6,123,159 A | 9/2000 | Brookey et al. | |
| 6,787,506 B2 | 9/2004 | Blair et al. | |
| 6,855,672 B2 * | 2/2005 | Poelker et al. ............. 507/225 |
| 7,159,655 B2 * | 1/2007 | Ke et al. .................. 166/279 |
| 7,192,907 B2 | 3/2007 | Patel | |
| 7,270,180 B2 * | 9/2007 | Ke et al. .................. 166/279 |
| 2005/0215439 A1 * | 9/2005 | Blair ....................... 507/222 |

OTHER PUBLICATIONS

Fernández, I.J., "Evaluation of Cationic Water-Soluable Polymers with Improved Thermal Stability" Presented at the SPE International Symposium on Oilfield Chemistry, Houston, TX, Feb. 2-4, 2005 (SPE 93003).
Graham, G.M., et al., "The Impact of Dissolved Iron . . . " Presented at the SPE International Symposium on Oilfield Chemistry, Houston, TX, Feb. 5-7, 2003 (SPE 80254).
Graham, G.M., et al., "The Importance of Appropriate Laboratory Procedure . . . " Presented at the SPE Oilfield Scale Symposium, Aberdeen, U.K., Jan. 30-31, 2002 (SPE 74679).
Graham, G.M., et al., "Occurance, Prediction and Prevention of Zinc Sulfide Scale . . . " Presented at the SPE Third International Symposium on Oilfield Scale, Aberdeen, U.K., Jan. 30-31, 2001 (SPE 68317).

* cited by examiner

*Primary Examiner*—George Suchfield
(74) *Attorney, Agent, or Firm*—John Wilson Jones; Jones & Smith, LLP

(57) ABSTRACT

A formulation containing a copolymer derived from a cationic monomer effectively inhibits and controls the formation of inorganic scales. Suitable copolymers include those comprising an acrylamide unit and a quaternary ammonium salt group, and optionally an acrylate and/or nitrogen heterocyclic monomer including those wherein the quaternary ammonium salt is a unit of the formula:

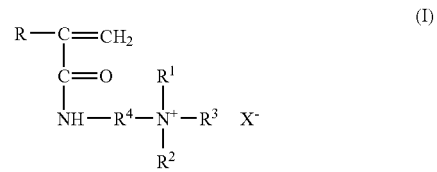

wherein R is methyl or hydrogen; $R^4$ is a $C_1$ to $C_6$ alkyl group, optionally substituted with halogen, hydroxyl and alkoxy groups, X is halogen; and $R^1$, $R^2$ and $R^3$ are independently selected from the group consisting of alkyl and alkoxy groups. Suitable nitrogen heterocyclic compounds include N-vinylpyrrolidone, N-vinylformamide, N-vinylacetamide, N-vinylcaprolactam, N-vinylimidazole and N-vinylpyridine. The copolymers have particular applicability in the control and inhibition of zinc sulfide or iron sulfide scales, typically formed when zinc bromide brines are used as fluids in the treatment of a gas or oil well, such as a completion fluid.

25 Claims, No Drawings

METHOD FOR INHIBITING OR CONTROLLING INORGANIC SCALE FORMATIONS WITH COPOLYMERS OF ACRYLAMIDE AND QUATERNARY AMMONIUM SALTS

This application is a continuation-in-part application of U.S. patent application Ser. No. 10/671,156, filed on Sep. 25, 2003, now U.S. Pat. No. 7,159,655.

FIELD OF THE INVENTION

The invention relates to inhibitors for inorganic scales in oilfield applications. The copolymers and terpolymers of the invention have particular applicability in the inhibition and control of zinc sulfide, as well as iron sulfide, scales.

BACKGROUND OF THE INVENTION

Brines are widely used in well completion as a kill fluid, completion fluid, packer fluid or workover fluid, etc. Generally, a zinc bromide ($ZnBr_2$) brine will be used when a brine is required to have a density of about 14.0 ppg or above, or even lower if low True Crystallization Temperature (TCT) fluid is required. Depending on the economic concern and the requirements of their properties, the zinc bromide fluids applied include $CaBr_2/ZnBr_2$ two-salt and $CaCl_2/CaBr_2/ZnBr_2$ three-salt brines.

During completion of the well, however, such brines may become lost in the reservoir and remain in the formation for a long period of time. If a reservoir contains hydrogen sulfide ($H_2S$) gas, or sulfur-containing chemical was used during the completion of the wells, or a formation water contains sulfide ion, zinc sulfide (ZnS) or iron sulfide (FeS, $Fe_2S_3$, $FeS_2$) scales can form when a zinc bromide brine is commingled with sulfide ion and where soluble iron is available as a result of corrosion. The formation of zinc sulfide or iron sulfide scales can damage well productivity through a variety of associated problems such as 1) plugging of flow channels in the formation and across the perforation and 2) scaling on downhole tool assembles and surface facilities, etc.

To remove zinc sulfide or iron sulfide scales, an acid treatment is normally performed. After the acid treatment, the production rate may be restored to its previous level. However, new zinc sulfide or iron sulfide scale deposits can be formed in the well in a short period of time, and a re-treatment is required. This translates to increased costs. In addition, there are significant risks associated with acid treatments in high temperature, high-pressure gas wells. These include corrosivity of acid at high temperature and the generation of toxic $H_2S$ gas during the treatment.

Prevention of formation of zinc sulfide or iron sulfide scales may be effectuated by treating the zinc bromide brine with a zinc sulfide and iron sulfide scale inhibitor during well completion before scaling can occur downhole. There are several sulfide scale inhibitors on the market. These conventional sulfide scale inhibitors were originally developed for prevention of sulfate and carbonate scales in fresh water and low-density brines, such as KCl, NaCl or $NH_4Cl$. These can be categorized into several families of chemicals such as phosphate esters, phosphonate/phosphonic acids, chelating agents, and polymeric inhibitors. Phosphonate/phosphonic acid type scale inhibitors have demonstrated their effectiveness to control ZnS scale at relatively low concentration. Polymeric scale inhibitors, such as sodium salt of acrylamido-methyl propane sulfonate/acrylic acid copolymer (AMPS/AA), phosphinated maleic copolymer (PHOS/MA) or sodium salt of polymaleic acid/acrylic acid/acrylamidomethyl propane sulfonate terpolymers (PMA/AMPS), are also effective scale inhibitors to control ZnS scales in fresh water and low density brines but not high density brines.

Although chelating agents have been reported to be effective scale inhibitors, their effectiveness is limited in heavy brines since their loading is in direct proportion to $Zn^{2+}$ concentration. With chelating agents, stoichiometric reactions are typically required in order to form a stable complex between chelating agent and zinc ion. The high $Zn^{2+}$ ion concentration of zinc bromide completion fluid makes this approach not practicable.

Unlike traditional scale inhibitors, especially those applied in fresh water or very low salt solutions (approximately 3 percent salt), inhibitors designed for zinc brines are generally required to be compatible with more than 50 percent dissolved salt. Thus, in zinc brines, the extremely high salt content and the limited amount of free water severely restricts both the solubility and effectiveness of the inhibitor. Thus, it is not practical to use a chelating agent in a completion brine that contains significant amount of $Zn^{2+}$ ions.

For the majority of the scale inhibitors mentioned above, especially for polymeric inhibitors, their solubility in high density completion brines is very limited due to the high concentration of $Zn^{2+}$ and $Ca^{2+}$ ions present in the brines and very limited free water available. Further, high concentrations of $Zn^{2+}$ and $Ca^{2+}$ ions are detrimental to the effectiveness of phosphonic based scale inhibitors.

Furthermore, due to very limited free water in high-density brines, it is very difficult for a scale inhibitor to completely dissolve in the brine. During well completion operations, the completion brine is under constant circulation and filtration. Any scale inhibitor that is not totally soluble in the brine can be removed from the system and lose its effectiveness during the operation.

A need exists therefore for new zinc sulfide or iron sulfide scale inhibitors that have good solubility in high-density brines and which can effectively control ZnS or iron sulfide scaling.

SUMMARY OF THE INVENTION

Formation of inorganic scales may be inhibited and/or controlled in subterranean formations, an oil or gas well or in a wellbore by pumping downhole a copolymer comprising an acrylamide unit and a quaternary ammonium salt group, and optionally an acrylate and/or nitrogen heterocyclic monomer. Such copolymers improve overall well completion effectiveness.

In a preferred embodiment, the copolymer comprises an acrylamide unit and a diallyidimethylammonium salt and, optionally, an acrylic acid or a salt thereof.

In another preferred embodiment, the copolymer comprises an acrylamide unit and a unit of the formula:

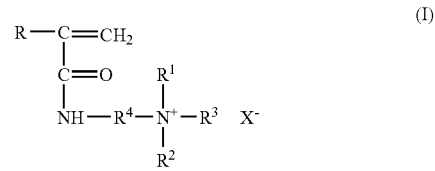

wherein R is methyl or hydrogen; $R^4$ is a $C_1$ to $C_6$ alkyl group, optionally substituted with halogen, hydroxyl or an alkoxy (preferably methoxy and ethoxy) groups, X is halogen; and $R^1$, $R^2$ and $R^3$ are independently selected from the group consisting of alkyl and alkoxy groups, preferably methyl, ethyl, methoxy and ethoxy.

The incorporation of at least one nitrogen heterocyclic compound in the copolymer improves the thermal stability of the resulting copolymer and fluids containing the copolymer. Preferred as the nitrogen heterocyclic compound are N-vinylpyrrolidone, N-vinylformamide, N-vinylacetamide, N-vinylcaprolactam, N-vinylimidazole and N-vinylpyridine.

The copolymers have particular applicability in the control and inhibition of zinc sulfide or iron sulfide scales, typically formed when zinc bromide brines are used as fluids in the treatment of a gas or oil well, such as a completion fluid.

The cationic nature of the copolymer greatly improves its compatibility for use as a scale inhibitor with high-density brines. In light of the presence of the cationic monomer, the polymers of the invention exhibit high solubility in high-density brines, such as zinc bromide brines.

DETAILED DESCRIPTION OF THE PREFERRED EMBODIMENTS

The polymer for use in the invention is a copolymer comprising at least one monomer of an acrylamide unit and a quaternary ammonium salt group, and optionally an acrylate and/or nitrogen heterocyclic monomer. (As used herein, the term "copolymer" shall refer to a polymer containing at least two monomers or building blocks and shall include polymers composed of greater than two monomers or building blocks, such as terpolymers.)

The molecular weight of the copolymer is typically between from about 20,000 to about 3,000,000. As used herein, unless stated to the contrary, "molecular weight" refers to weight average molecular weight.

Examples of the quaternary ammonium salt used include those obtained by cationizing a tertiary-amino-containing monomer such as N,N-dimethylaminoethyl (meth)acrylate, N,N-diethylaminoethyl (meth)acrylate, N,N-dimethylaminopropyl (meth)acrylate, N,N-diethylaminopropyl (meth) acrylate, N,N-dimethylaminoethyl (meth)acrylamide, N,N-diethylaminoethyl (meth)acrylamide, N,N-dimethylaminopropyl (meth)acrylamide, N,N-diethylaminopropyl (meth)acrylamide, p-dimethylaminomethylstyrene, p-dimethylaminoethylstyrene, p-diethylaminomethylstyrene or p-diethylaminoethylstyrene with a cationizing agent, for example, a halogenated alkyl such as methyl chloride, methyl bromide or methyl iodide, a dialkylsulfuric acid such as dimethylsulfuric acid, an epichlorohydrin-added tertiary amine mineral acid salt such as N-(3-chloro-2-hydroxypropyl)-N,N,N-trimethylammonium chloride, an inorganic salt such as hydrochloric acid, hydrobromic acid, sulfuric acid or phosphoric acid, or a carboxylic acid such as formic acid, acetic acid or propionic acid.

Further preferred are dialkyldiallylammonium salts, polyvinyl benzyl trialkyl ammonium salts, salts of polyepichlorohydrin quaternized with trialkyl amine, polymethacrylamidoalkyltrialkyl ammonium salts, polymethacryloyloxyalkyltrialkyl ammonium salts, and polymethacryloyloxyalkyl dialkyl hydroxyalkyl ammonium salt wherein the alkyl is preferably a $C_1$-$C_3$ alkyl group. Preferred are polyvinyl benzyl trimethyl ammonium salts, salts of polyepichlorohydrin quaternized with trimethyl amine, polymethacrylamidopropyltrimethyl ammonium salts, polymethacryloyloxyethyltrimethyl ammonium salts, polyacrylamidopropyltrimonium chloride and polymethacryloyloxyethyl dimethyl hydroxyethyl ammonium salt.

Especially preferred as quaternary ammonium salt are dimethyldiallylammonium salts, such as dimethyldiallylammonium chloride, and derivatives from acrylamide or acrylic acid such as acrylamidoethyltrimethylammonium chloride, acrylamide/dimethylaminoethyl acrylate methyl chloride quaternary ammonium salt, poly(acrylamide/dimethylaminoethyl methacrylate methyl chloride quaternary ammonium salt), poly(acrylamide/diallyldimethyl ammonium chloride), poly(dimethylaminoethyl acrylate methyl chloride quaternary ammonium salt), and poly(dimethylaminoethyl methacrylate methyl chloride quaternary ammonium salt).

In another especially preferred embodiment, the quaternary ammonium salt is of the formula:

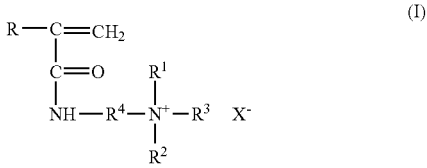

wherein R is methyl or hydrogen; $R^4$ is a $C_1$ to $C_6$ alkyl group, optionally substituted with halogen, hydroxyl or an alkoxy (preferably ethoxy and methoxy) groups; most preferably $R^4$ is —$CH_2CH_2CH_2$—;

X is halogen, preferably chlorine; and $R^1$, $R^2$ and $R^3$ are independently selected from the group consisting of alkyl and alkoxy groups, preferably methyl, ethyl, methoxy and ethoxy groups, most preferably $R^1$, $R^2$ and $R^3$ are each methyl.

Suitable for use as the "acrylamide" unit could be acrylamide, (meth)acrylamide, diacetone acrylamide, and N-methylolacrylamide.

The molar ratio of acrylamide unit:quaternary ammonium salt in the copolymer is generally between from about 1:5 to about 5:1. In a preferred embodiment, the weight ratio of the acrylic acid:quaternary ammonium salt:acrylamide unit is approximately from about 1:2:1 to about 1:1:1.

In a preferred embodiment, the quaternary ammonium salt is diallyidimethylammonium salt and the molar ratio of acrylamide:diallyldimethylammonium salt is from about 1:2 to about 2:1. Such copolymers include the water-soluble polymers known as Polyquaternium-7. In a preferred embodiment, the copolymer is poly(acrylamide-co-diallyidimethylammonium chloride).

In an alternative embodiment, the copolymer for use in the invention is a terpolymer of an acrylic acid, an acrylamide and quaternary ammonium salt. Suitable as use for the acrylate are acrylic acid, (meth)acrylic acid as well as a salt of acrylic acid or (meth)acrylic acid. Such salts include alkali salts, like sodium salts. The molar ratio of the acrylic acid or salt thereof (when present) and the acrylamide is typically between from about 2:1 to about 1:3, preferably 1:1. (As used herein, the term "copolymer" shall refer to a polymer containing at least two monomers or building blocks and shall include polymers composed of greater than two monomers or building blocks, such as terpolymers.) The molar ratio of the acrylamide unit: quaternary ammonium salt is between from about 1:5 to about 5:1. In a preferred embodiment, the weight ratio of the acrylic acid:quaternary ammonium salt:acrylamide unit is approximately from about 1:2:1 to about 1:1:1.

In still another alternative embodiment, the copolymer for use in the invention is a terpolymer of an acrylamide, quaternary ammonium salt and a nitrogen heterocyclic compound.

Suitable nitrogen heterocyclic compounds include N-vinylpyrrolidone, N-vinylformamide, N-vinylacetamide, N-vinylcaprolactam, N-vinylimidazole and N-vinylpyridine. The terpolymer may further contain an acrylate. When present, the molar ratio of the nitrogen heterocyclic compound and the acrylamide is typically between from about 90:10 to about 10:90. In a preferred embodiment, the terpolymer comprises monomers in the molar ratios of 10 to 90 (acrylamide), 5 to 80 (quaternary ammonium salt) and 5 to 80 (nitrogen heterocyclic compound) (wherein the molar sum of acrylamide, quaternary ammonium salt and nitrogen heterocyclic compound is 100).

The copolymer for use in the invention may be a block copolymer containing block segments of the monomer(s) or a random copolymer.

The polymers of the invention effectively inhibits, controls or treats deposited inorganic scale formations in subterranean formations, such as oil wells, gas wells and wellbores. As such, the polymers of the invention may be used to treat scales of calcium, barium, magnesium salts and the like, such as barium sulfate, calcium sulfate, calcium fluoride and calcium carbonate scales. The copolymer has particular application in the treatment of zinc sulfide or iron sulfide scales.

The polymers of the invention are especially useful in fluids for the treatment of gas wells or oils wells. For example, the fluid may be a completion fluid or completion brine. Such fluids may contain brine containing zinc bromide, calcium bromide, calcium chloride, or a combination thereof or sodium bromide.

Thus, the copolymer as a scale inhibitor may be introduced into an oil well or gas well as part of a carrier fluid or as a component of the brine. The carrier fluid typically contains between from 0 to about 10 weight percent KCl, NaCl, or NH$_4$Cl or another inorganic salt. The amount of copolymer present in the carrier fluid is typically between from about 15 ppm to about 100,000 ppm depending upon the severity of the scale deposition. When present with brine, the weight percentage of copolymer is generally between from about 0.0025 to about 2 weight percent. Further, the scale inhibitor of the invention may be added directly to a fracturing fluid or an acidizing fluid, such as a matrix acidizing fluid.

The scale inhibitors used in the invention may be easily dissolved in high density brines without phase separation or sediment formation. In addition, they are active in high temperature environments wherein no phase separation or sediment formation occurs.

The cationic nature of the copolymer, due to the presence of the cationic monomer, significantly enhances the solubility of the copolymer in brines especially high-density brines or brines with high salt concentration. Brine materials suitable for use in the invention are those that have a density in the range of from about 8.4 to about 22 lb./gal and preferably the density will be from about 14 to about 22 lb./gal. In a preferred embodiment, the copolymer for use in the invention is soluble in high density brines, such as zinc bromide brines which exhibit a density of 14.0 ppg or higher. The high-density brine materials can contain water-soluble salts other than zinc bromide. For instance, the brines may contain sodium salts such as sodium chloride, sodium bromide, etc., calcium salts such as calcium chloride, calcium bromide, etc. other zinc salts such as zinc chloride, zinc bromide, etc. and the like.

The following examples will illustrate the practice of the present invention in its preferred embodiments. Other embodiments within the scope of the claims herein will be apparent to one skilled in the art from consideration of the specification and practice of the invention as disclosed herein.

It is intended that the specification, together with the examples, be considered exemplary only, with the scope and spirit of the invention being indicated by the claims that follow.

EXAMPLES

All percentages expressed herein are in terms of weight percent unless otherwise noted.

Examples 1-20

In each of the Examples below, either 0.5% or 1% (by volume) copolymer or terpolymer was used to treat the ZnBr$_2$ completion brines. For purposes of these examples, the term copolymer or terpolymer shall contain either "PADAC" [poly(acrylamide-co-diallyldimethylammonium chloride)] in a 5 weight percent solution in water or an "AADAC" [a terpolymer of acrylic acid, dimethyldiallylammonium chloride and acrylamide] in a 5 weight percent solution in water. To evaluate the effectiveness of formulated PADAC and AADAC, the following method was applied, and the results obtained are presented in Tables 1, 2 and 3.

A 3% sodium chloride brine was prepared. Sodium sulfide was added to sodium chloride brine to produce sulfur ion. A ZnBr$_2$ brine (either CaBr$_2$/ZnBr$_2$ or CaCl$_2$/CaBr$_2$/ZnBr$_2$) was then prepared. ZnS scale inhibitor was added to the ZnBr$_2$ brine. Sodium chloride brine and ZnBr$_2$ brine was mixed at a 1:1 volumetric ratio in a glass jar. The glass jar was placed in a 180° F. water bath. ZnS scaling tendency vs. time was then noted. Also, to evaluate the performance of the copolymer at higher temperatures, the glass jar was first placed in a pressure bomb, and the bomb was then pressurized with a 300 psi nitrogen gas and finally placed in an oven at 300° F. Zinc sulfide scaling was reported over a period of four hours. Examples 1-10 (Table 1, Testing at 180° F.) and 15-20 (Table 3, Testing at 300° F.) employed a copolymer containing PADAC. Examples 11-14 (Table 2, Testing at 180° F.) employed a terpolymer of AADAC.

TABLE 1

Scaling Tests at 180° F.

| Example | Mixtures | One-hour observation | Two-hour observation |
|---|---|---|---|
| 1 | 3% NaCl with 25 ppm sulfur: 17.4 ppg CaBr$_2$/ZnBr$_2$ | Slight Scaling | Scaling and flocculating |
| 2 | 3% NaCl with 25 ppm sulfur: 17.4 ppg CaBr$_2$/ZnBr$_2$ brine with 0.5% copolymer | No Scaling | No Scaling |
| 3 | 3% NaCl with 25 ppm sulfur: 15.5 ppg CaBr$_2$/ZnBr$_2$ brine with 1% copolymer | No Scaling | No Scaling |
| 4 | 3% NaCl with 25 ppm sulfur: 17.4 ppg CaCl$_2$/CaBr$_2$/ZnBr$_2$ | Slight Scaling | Scaling and flocculating |
| 5 | 3% NaCl with 25 ppm sulfur: 17.4 ppg CaCl$_2$/CaBr$_2$/ZnBr$_2$ brine with 0.5% copolymer | No Scaling | No Scaling |
| 6 | 3% NaCl with 25 ppm sulfur: 15.5 ppg CaCl$_2$/CaBr$_2$/ZnBr$_2$ brine with 1% copolymer | No Scaling | No Scaling |
| 7 | 3% NaCl with 50 ppm sulfur: 17.4 ppg CaBr$_2$/ZnBr$_2$ | Scaling | Scaling and flocculating |
| 8 | 3% NaCl with 50 ppm sulfur: 17.4 ppg CaBr$_2$/ZnBr$_2$ brine with 0.5% copolymer | No Scaling | No Scaling |

TABLE 1-continued

Scaling Tests at 180° F.

| Example | Mixtures | One-hour observation | Two-hour observation |
|---|---|---|---|
| 9 | 3% NaCl with 50 ppm sulfur: 17.4 ppg CaCl$_2$/CaBr$_2$/ZnBr$_2$ | Scaling | Scaling and flocculating |
| 10 | 3% NaCl with 50 ppm sulfur: 17.4 ppg CaCl2/CaBr2/ZnBr2 brine with 0.5% copolymer | No Scaling | No Scaling |

TABLE 2

Scaling Tests at 180° F.

| Example | Mixtures | One-hour observation | Two-hour observation |
|---|---|---|---|
| 11 | 3% NaCl with 25 ppm sulfur: 17.4 ppg CaBr2/ZnBr2 | Slight Scaling | Scaling and flocculating |
| 12 | 3% NaCl with 25 ppm sulfur: 17.4 ppg CaBr$_2$/ZnBr$_2$ brine with 0.5% terpolymer | No Scaling | No Scaling |
| 13 | 3% NaCl with 25 ppm sulfur: 17.4 ppg CaCl$_2$/CaBr$_2$/ZnBr$_2$ | Slight Scaling | Scaling and flocculating |
| 14 | 3% NaCl with 50 ppm sulfur: 17.4 ppg CaCl$_2$/CaBr$_2$/ZnBr$_2$ brine with 0.5% terpolymer | No Scaling | No Scaling |

TABLE 3

Scaling Tests at 300° F.

| Example | Mixtures | Four-hour observation |
|---|---|---|
| 15 | 3% NaCl with 25 ppm sulfur: 16.5 ppg CaCl$_2$/CaBr$_2$/ZnBr$_2$ | Scaling |
| 16 | 3% NaCl with 25 ppm sulfur: 16.5 ppg CaCl$_2$/CaBr$_2$/ZnBr$_2$ with 0.5% copolymer | No Scaling |
| 17 | 3% NaCl with 25 ppm sulfur: 16.5 ppg CaCl$_2$/CaBr$_2$/ZnBr$_2$ with 1% copolymer | No Scaling |
| 18 | 3% NaCl with 50 ppm sulfur: 16.5 ppg CaCl$_2$/CaBr$_2$/ZnBr$_2$ | Scaling |
| 19 | 3% NaCl with 50 ppm sulfur: 16.5 ppg CaCl$_2$/CaBr$_2$/ZnBr$_2$ with 0.5% copolymer | No Scaling |
| 20 | 3% NaCl with 50 ppm sulfur: 16.5 ppg CaCl$_2$/CaBr$_2$/ZnBr$_2$ with 1% copolymer | No Scaling |

Examples 21-24

A zinc bromide based brine having a density of 17.6 pound/gallon (ppg) was formulated from calcium chloride, calcium bromide, zinc bromide and fresh water by blending standard 15.1 ppg CaCl$_2$/CaBr$_2$ fluid with 19.2 ppg CaBr$_2$/ZnBr$_2$ fluid. The brine was composed of 35.12 wt. percent of ZnBr$_2$, 29.76 wt. percent of CaBr$_2$, 6.76 wt. percent of CaCl$_2$ and 28.42 wt. percent of water. Further, the weight percent of each individual ion in the brine was 10.19 Zn, 8.39 Ca, 4.28 Cl and 48.73 Br.

Compatibility of a copolymer of acrylamidopropyltrimonium chloride and acrylamide in 1 weight percent solution in water, a product of Ciba Specialty Chemicals, was then tested with the zinc bromide brine. The copolymer was added to the zinc brine. The brine was then mixed with a 3% sodium chloride solution at a 1:1 volumetric ratio in a glass jar. The glass jar was placed in the water bath of 180° F. Compatibility vs. time was noted. For compatibility test at 300° F., the glass jar was placed in a pressure bomb. The pressure bomb was then purged three times with nitrogen, and placed in an oven at 300° F. for 18 hours. At the end of the test, the glass jar was removed from the pressure bomb, its appearance was recorded for any precipitation/flocculation, and haze, as set forth in Table 4 and Table 5 below:

TABLE 4

Scaling Tests in 17.6 ppg Zinc Brine at 180° F.

| Example | Concentration of Copolymer, mg/L | Initial Observation | After 3 hours |
|---|---|---|---|
| 21 | 250 | Clear solution | Clear solution |
| 22 | 500 | Clear solution | Clear solution |

TABLE 5

Scaling Tests in 17.6 ppg Zinc Brine at 300° F.

| Example | Concentration of Copolymer, mg/L | Initial Observation | After 18 hours |
|---|---|---|---|
| 23 | 250 | Clear solution | Clear solution |
| 24 | 500 | Clear solution | Clear solution |

Table 4 and 5 illustrate that copolymers of polyquaternium ammonium salt and acrylamide demonstrate excellent solubility in heavy zinc brine at 180 to 300° F.

Examples 25-35

Zinc bromide based brines having a density of 15.5, 16.0, 16.5 and 17.0 ppg were formulated as above and the weight percentage of each individual salt for the different brine densities, as well as the weight percentage of each individual ion for the different brine densities, are listed in Table 6 and Table 7, respectively.

TABLE 6

| Density ppg | ZnBr$_2$ Weight % | CaBr$_2$ Weight % | CaCl$_2$ Weight % | H$_2$O Weight % |
|---|---|---|---|---|
| 17.0 | 27.63 | 32.71 | 9.53 | 30.17 |
| 16.5 | 20.98 | 35.33 | 12.05 | 31.64 |
| 16.0 | 13.91 | 38.12 | 14.73 | 33.24 |
| 15.5 | 6.38 | 41.09 | 17.58 | 34.95 |

TABLE 7

| Density ppg | Zn Weight % | Ca Weight % | Cl Weight % | Br Weight % |
|---|---|---|---|---|
| 17.0 | 8.02 | 10.00 | 6.09 | 45.77 |
| 16.5 | 6.09 | 11.44 | 7.70 | 43.14 |
| 16.0 | 4.04 | 12.96 | 9.41 | 40.35 |
| 15.5 | 1.85 | 14.59 | 11.23 | 37.38 |

To a 3% sodium chloride brine was added sodium sulfide to produce sulfide ions. ZnS scale inhibitor was added to the ZnBr$_2$ brine. Thereafter, sodium chloride brine and ZnBr$_2$ brine were mixed at a 1:1 volumetric ratio in a glass jar and placed in a pressure bomb. The pressure bomb was purged three times with nitrogen, and placed in an oven at 275° F. or 300° F. for designated period of time. At the end of the test, the pressure bomb was removed from the glass jar and its appearance recorded for any precipitation, flocculation, and haze. Tests were performed with concentrations in the range of 50 to 450 mg/L for the copolymer of Examples 21-24 at 275° F. and 300° F. with sulfide loading of 50 ppm. Some test results are summarized in Tables 8, 9 and 10.

TABLE 8

Effect of Loading on 16.5 ppg Zinc Brine with 50 ppm Sulfide at 300° F.

| Example No. | Loading (mg/L) | 7 (hour) | 24 (hour) | 31 (hour) | 48 (hour) |
|---|---|---|---|---|---|
| 25 | 350 | Clear solution | Clear solution | Clear solution | Clear solution |
| 26 | 450 | Clear solution | Clear solution | Clear solution | Clear solution |

Table 8 illustrates the effectiveness of the inhibitor in 16.5 ppg zinc bromide brine; clear solutions being present at 300° F. for over 48 hours at concentration of inhibitor of 350 and 450 mg/L.

TABLE 9

Activity in Zinc Brines with 50 ppm sulfide at 275° F.

| Example | Fluid System Density | System pH | Stable Time (hours) |
|---|---|---|---|
| 27 | 17.6 | 4.8 | Clear solution |
| 28 | 16.5 | 5.2 | Clear solution |
| 29 | 16.0 | 5.4 | Clear solution |
| 30 | 15.5 | 5.6 | Clear solution |

As illustrated in Table 9, the copolymer provides effective scale inhibition in brines having a density range from 15.5 to 17.6 ppg at 275° F.

The performance of the scale inhibitor of the copolymer in zinc brine having a density from 15.5 to 17.6 ppg at 300° F. with 50 ppm sulfide at 300° F. is tabulated in Table 10 wherein the effectiveness of the scale inhibitor for 24 hour test is displayed.

TABLE 10

Inhibitor Activity in Zinc Brines with 50 ppm sulfide at 300° F.

| Example | Fluid System Density | Zn, wt. percent | Observations |
|---|---|---|---|
| 31 | 17.6 | 10.19 | Clear solution |
| 32 | 17.0 | 8.02 | Clear solution |
| 33 | 16.5 | 6.09 | Clear solution |
| 34 | 16.0 | 4.04 | Clear solution |
| 35 | 15.5 | 1.85 | Clear solution |

From the foregoing, it will be observed that numerous variations and modifications may be effected without departing from the true spirit and scope of the novel concepts of the invention.

What is claimed is:

1. A method for inhibiting or controlling inorganic scale formations in a subterranean formation, an oil or gas well or in a wellbore, comprising pumping downhole a copolymer comprising:

(A) a quaternary ammonium salt of the formula:

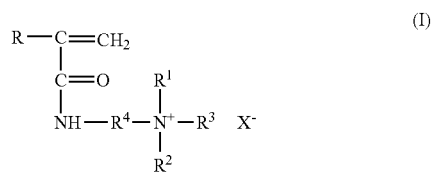

wherein:
R is hydrogen;
R$^4$ is a C$_1$ to C$_6$ alkyl group, optionally substituted with one or more substituents selected from the group consisting of halogen, hydroxyl and alkoxy;
X is halogen; and
R$^1$, R$^2$ and R$^3$ are independently selected from the group consisting of alkyl and alkoxy; and (B) an acrylamide unit wherein the inorganic scale formations are zinc sulfide, iron sulfide, calcium salts, barium salts or magnesium salts.

2. The method of claim 1, wherein R$^1$, R$^2$ and R$^3$ are each methyl.

3. The method of claim 2, wherein X is chlorine.

4. The method of claim 3, wherein R$^4$ is —CH$_2$CH$_2$CH$_2$—.

5. The method of claim 1, wherein the acrylamide unit is acrylamide, (meth)acrylamide, diacetone acrylamide or N-methylolacrylamide.

6. The method of claim 5, wherein the acrylamide unit is acrylamide.

7. The method of claim 1, wherein the copolymer is pumped downhole as part of a brine.

8. The method of claim 7, wherein the brine contains calcium bromide, zinc bromide, calcium chloride or a combination thereof or sodium bromide.

9. The method of claim 1, wherein the copolymer is pumped downhole as a component of a fracturing or acidizing fluid.

10. The method of claim 1, wherein the inorganic scale formations are zinc sulfide or iron sulfide scale formations.

11. The method of claim 1, wherein the weight average molecular weight of the copolymer is between from about 20,000 to about 3,000,000.

12. The method of claim 1, wherein the molar ratio of acrylamide unit:quaternary ammonium salt is between from about 1:5 to about 5:1.

13. The method of claim 1, wherein the copolymer further comprises an acrylic acid unit.

14. The method of claim 1, wherein the inorganic scale formations are calcium salts, barium salts or magnesium salts scale formations.

15. A method for inhibiting or controlling inorganic scale formations in a subterranean formation, an oil or gas well or in a wellbore, comprising pumping downhole a copolymer comprising:

(A) a quaternary ammonium salt;
(B) an acrylamide unit; and
(C) a nitrogen heterocyclic compound selected from the group consisting of N-vinylpyrrolidone, N-vinylformamide, N-vinylacetamide, N-vinylcaprolactam, N-vinylimidazole and N-vinylpyridine.

16. The method of claim 15, wherein the quaternary ammonium salt is a compound of the formula:

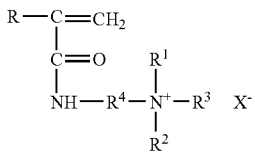

wherein:
R is methyl or hydrogen;
$R^4$ is a $C_1$ to $C_6$ alkyl group, optionally substituted with one or more substituents selected from the group consisting of halogen, hydroxyl, methoxy and ethoxy;
X is halogen; and
$R^1$, $R^2$ and $R^3$ are independently selected from the group consisting of methyl, ethyl, methoxy and ethoxy.

17. The method of claim 16, wherein $R^1$, $R^2$ and $R^3$ are each methyl and X is chlorine.

18. The method of claim 17, wherein $R^4$ is —$CH_2CH_2CH_2$—.

19. The method of claim 15, wherein the acrylamide unit is acrylamide, (meth)acrylamide, diacetone acrylamide or N-methylolacrylamide.

20. The method of claim 19, wherein the acrylamide unit is acrylamide.

21. The method of claim 15, wherein the copolymer is pumped downhole as part of a brine.

22. The method of claim 15, wherein the copolymer is pumped downhole as a component of a fracturing fluid or an acidizing fluid.

23. The method of claim 15, wherein the inorganic scale formations are zinc sulfide or iron sulfide scale formations.

24. The method of claim 15, wherein the weight average molecular weight of the copolymer is between from about 20,000 to about 3,000,000.

25. The method of claim 15, wherein the inorganic scale formations are calcium salts, barium salts or magnesium salts scale formations.

\* \* \* \* \*